F. V. COOKE.
VEHICLE SPRING.
APPLICATION FILED JUNE 30, 1920.
1,421,410.
Patented July 4, 1922.
3 SHEETS—SHEET 1.
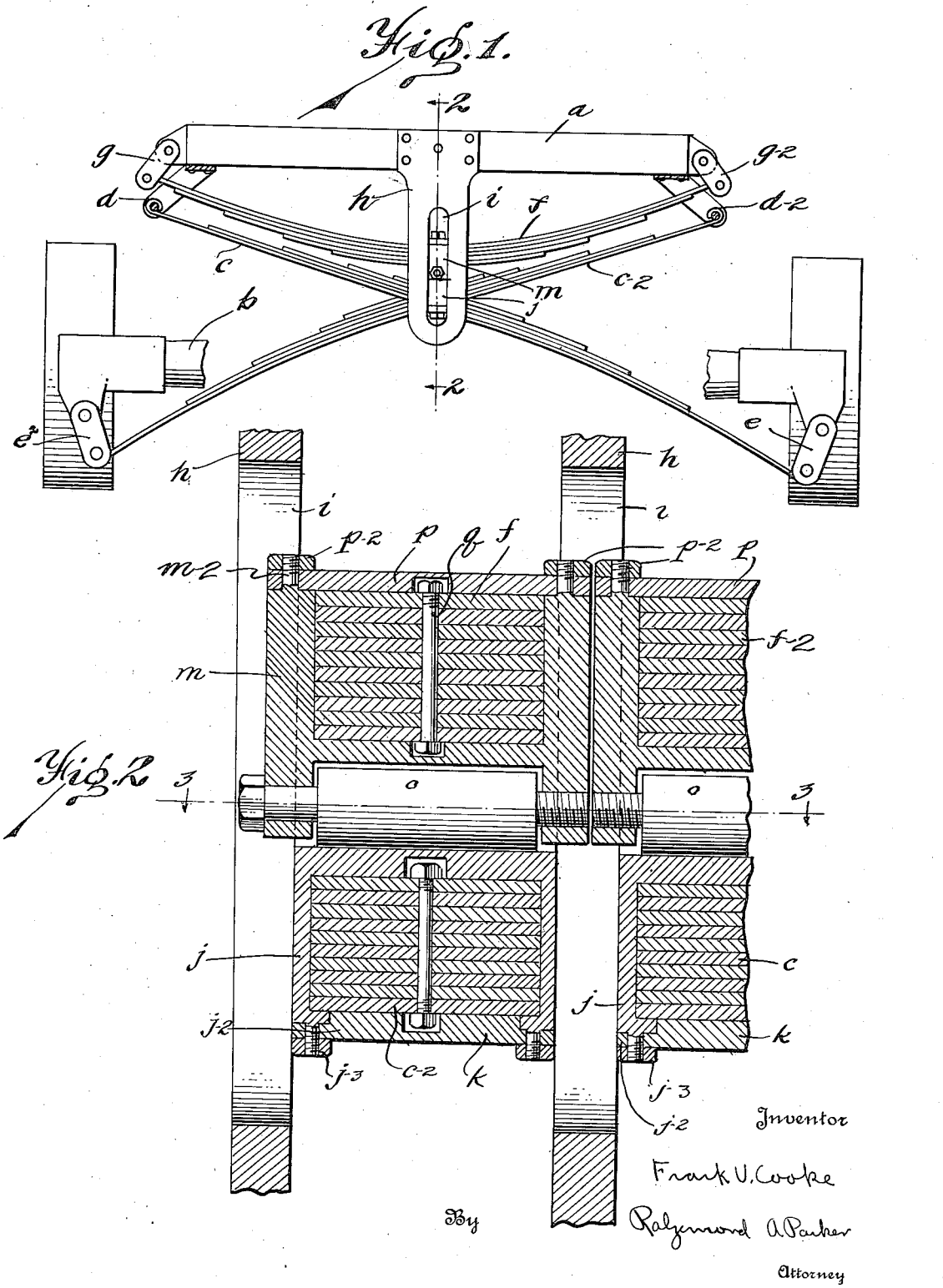

F. V. COOKE.
VEHICLE SPRING.
APPLICATION FILED JUNE 30, 1920.

1,421,410.

Patented July 4, 1922.
3 SHEETS—SHEET 2.

Inventor
Frank V. Cooke
By Ralzemond A. Parker
Attorney

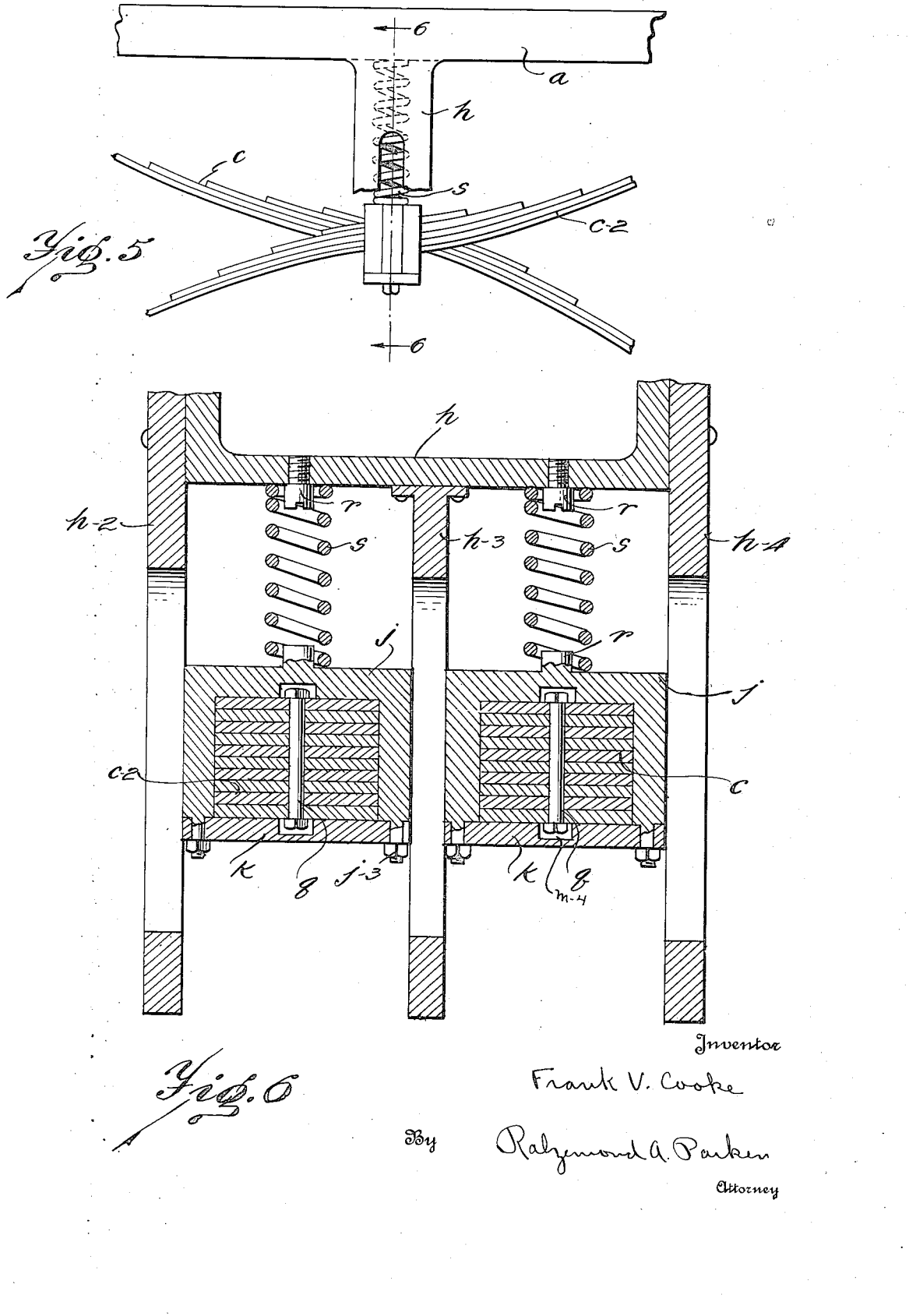

UNITED STATES PATENT OFFICE.

FRANK V. COOKE, OF DETROIT, MICHIGAN.

VEHICLE SPRING.

1,421,410. Specification of Letters Patent. Patented July 4, 1922.

Application filed June 30, 1920. Serial No. 392,940.

*To all whom it may concern:*

Be it known that I, FRANK V. COOKE, citizen of the United States, residing at Detroit, county of Wayne, State of Michigan, have invented a certain new and useful Improvement in Vehicle Springs, and declare the following to be a full, clear, and exact description of the same, such as will enable others skilled in the art to which it pertains to make and use the same, reference being had to the accompanying drawings, which form a part of this specification.

My invention relates to improvements in vehicle springs and particularly to springs intended for use on an automotive vehicle so that the load may be supported in the most advantageous manner and the resilient action of the spring be best utilized to serve the purpose.

In the drawings,—

Figure 1 is an elevational view of my improved spring attached to the rear axle of a vehicle.

Fig. 2 is a vertical cross-section taken on the line II—II of Fig. 1.

Fig. 5 is an elevation of a modification.

Fig. 6 is a section through this modification taken on the line 6—6 of Figure 5.

Figure 3:
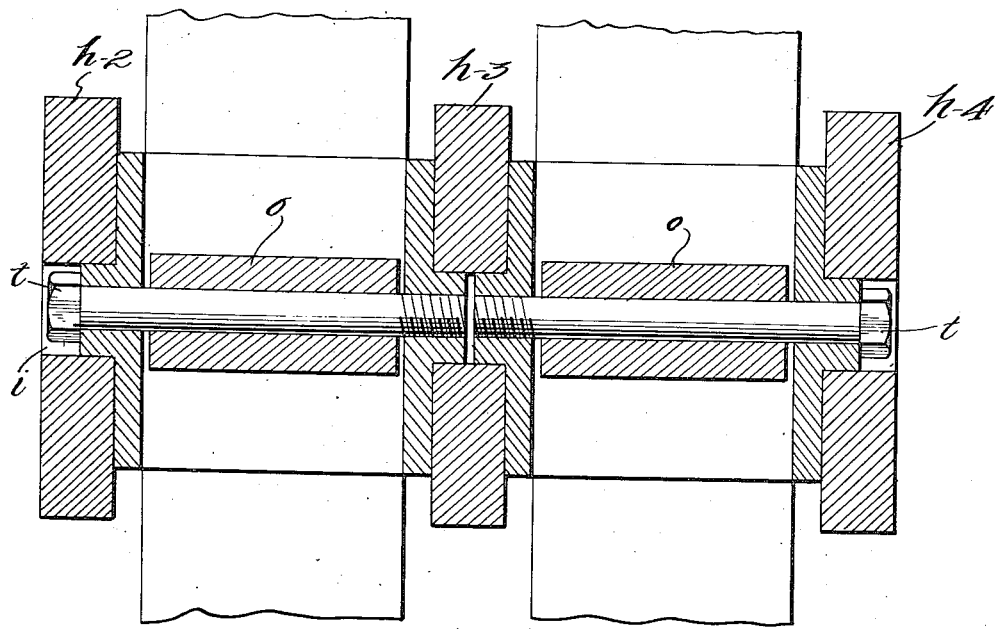
Fig. 3 is a sectional view taken on the line III—III of Fig. 2.
Figure 4:
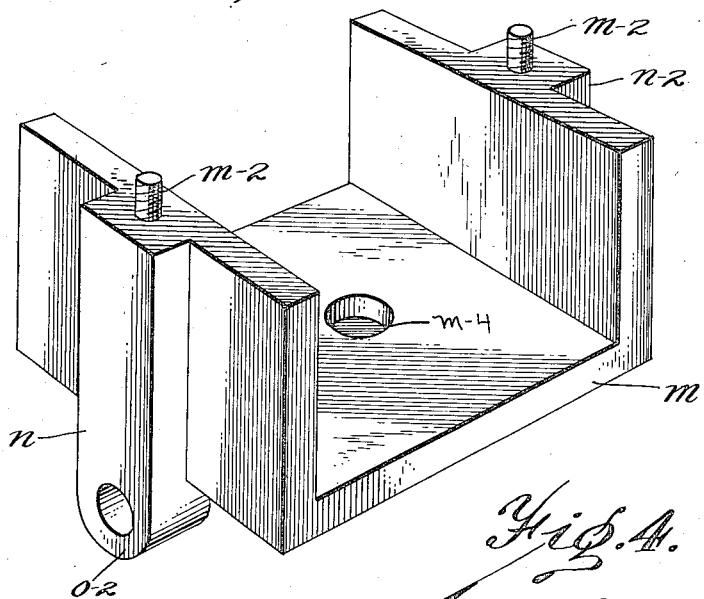
Fig. 4 is a perspective of the bearing box provided for one of the upper springs.

In the drawings, let $a$ represent the cross-piece of a frame which supports the body of a vehicle; $b$ the axle, in this instance a rear axle, and $c$ a spring attached to one side of the body and to the opposite extremity of the axle. $c^2$ is a similar spring attached to the other side of the body and the opposite extremity of the axle. These springs are secured to the body by means of stationary brackets $d$ and $d^2$ respectively and to the axle by means of shackles $e$ and $e^2$ respectively.

Superimposed over the spring $c$ and $c^2$ so as to lie in the same vertical plane therewith, are semi-elliptic springs $f$ and $f^2$. The springs $f$ and $f^2$ have their opposite ends attached to opposite sides of the body by means of shackles $g$ and $g^2$.

As these springs are disposed in the same lateral plane but one of the springs is shown in Fig. 1. The spring $f$, however, cooperating with spring $c$, forms a vertical pair of springs and spring $f^2$ cooperating with the springs $c^2$ forms a similar vertical pair.

Depending from the body is a forked member $h$ comprising a series of parallel forks, three in number, indicated at $h^2$, $h^3$, and $h^4$. These forks are spaced from each other so as to receive therebetween the springs. One vertical pair of springs would be received between one pair of forks while the other vertical pair of springs would be received between the other pair of forks for vertical movement within said forks but lateral movement of the springs therein being restrained.

These forks are longitudinally slotted as at $i$ for a purpose hereinafter more particularly set forth. As it is desired that each of the lower springs be permitted a movement longitudinally of the spring as well as a vertical movement within the forked member, a bearing plate in the form of a box, indicated as $j$, is provided for each spring $c$ and $c^2$. As these bearing plates are in every respect similar, but one will be described. Bearing plate $j$ which encircles spring $c^2$ is provided with a smooth, flat exterior surface so that it may move freely between the forks $h$ both vertically and laterally. This bearing block is clamped around the spring $c^2$ by means of a tie-bar $k$ which is received over the projecting screw-threaded pins $j^2$ held in place by means of nuts $j^3$ threaded thereon. To position this bearing block $m$ relative the spring, a recess $m^4$ is provided adapted to receive the head of the bolt $q$, which bolt fastens the leaves of the spring together, the bearing block $j$ is also provided with a similar oppositely disposed recess adapted to receive the other end of the bolt $q$ as shown in Figure 2. This bearing block $j$ is of such a size that it will move freely between the forks of the forked member $h$ either vertically or in a direction longitudinal the spring.

As it is desired that the upper springs of each pair move but in a vertical direction within said forked member, they are provided with bearing plates in the form of a box so adapted as to permit this movement. As the bearing plates which encircle each of these upper springs $f$ and $f^2$ are in every respect similar, the bearing plate $m$ which encircles the springs $f$ will be described. The bearing plate $m$ encircling the spring $f$ is formed in the shape of a box provided with a tie bar $p$ which is received over the projecting ends $m^2$ of screwthreaded pins and held in place by means of nuts $p^2$. The interior of this bearing block $m$ is recessed in a manner similar to bearing block $j$ to receive, in this instance, the projecting ends of a tie bolt $q$. Bearing block $m$, however, is provided with oppositely-disposed vertical guide members $n$ which are adapted to fit within the slot $i$ in the forked member $h$. These guides permit the block to move vertically within said forked member, but restrain the lateral movement thereof. Each of the bearing blocks which encircles an upper spring is provided with depending ears $o^2$ perforated to receive a transverse bolt $t$. This bolt $t$ carries a roller bearing $o$ held in position between such depending ears spaced from said bearing block. It will be seen from the above that roller bearings $o$ are adapted to bear upon the upper surface of each of the bearing plates $j$ carried by the lower springs and that each of the upper springs $f$ and $f^2$, as the same extends longitudinally, is permitted a vertical movement within said forked member, but that each of the lower springs is permitted both vertical and longitudinal movement within said forked member.

I provide cross springs depending from the vehicle body and pivoted at opposite ends to the end of the axle furthest from the point of attachment to the body. These springs are embraced intermediate their ends by a forked member depending from the body in such a manner as to prevent their lateral distortion or movement while permitting movement longitudinally of the springs within said forked member, at the same time permitting movement vertically within said forked member.

The salient feature of this invention which distinguishes it from my previous application, Serial No. 326,445 allowed April 27, 1920, is that I here provide yielding or resilient fulcrum members intervening each of said springs and the vehicle body. These fulcrum members are positioned one above each of said springs in such a manner that the body will be supported thereby upon such springs. In my previous application the fulcrum support for the body was an unyielding, rigid support against which the springs acted. The yielding fulcrum member shown in my present application may be not only of the type previously described, but it may vary widely in detail construction.

In Figs. 5 and 6 I provide a modified yielding fulcrum support in the form of spiral springs $s$ of suitable size for the vehicle with which it is to be used.

A spiral spring $s$ is positioned above each of the leaf springs $c$ and $c^2$ intervening the body and such leaf springs and held in place by being seated over projecting studs $r$. Each of the leaf springs $c$ and $c^2$ is provided with a bearing block $j$ held in position thereon by means of tie bar $k$ and nuts $j^3$. A tie-bolt $q$ is provided to hold the separate leaves of the springs together, the opposite ends of which bolt are received in recesses in the bearing block, as shown in Fig. 6. Leaf springs $c$ and $c^2$ are therefore adapted, by means of these bearing blocks for movement longitudinally of the springs within this forked member and for movement vertically therein against the resistance of springs $s$. This construction would effect the same result as the construction shown in Figs. 1 and 2 in that a yielding fulcrum support is provided for the springs $c$ and $c^2$ intervening the vehicle body and such springs.

I claim:

1. The combination of a vehicle body, an axle, a spring attached to one side of the body and pivoted to the end of the axle furthest therefrom, a spring attached to the opposite side of the body and pivoted to the further end of the axle, a forked member depending from the body adapted to embrace the springs in such a manner as to limit lateral movement thereof while permitting unlimited movement longitudinally of the springs, a yielding fulcrum support for said springs adapted to permit vertical movement of said springs within said forked member.

2. The combination of a vehicle body, an axle, a spring pivoted to one side of the body and the end of the axle furthest therefrom, a spring pivoted to the other side of the body and the opposite end of the axle, means depending from the body adapted to embrace said springs provided with a yielding fulcrum for said springs, said means so adapted as to restrain lateral movement of said springs while permitting vertical movement against the yielding resistance of said fulcrum and movement longitudinally of the springs.

3. The combination of a vehicle body, an axle, a spring pivoted to one side of the body and to the end of the axle furthest therefrom, a spring pivoted to the other side of the body and the opposite end of the axle, a yielding fulcrum support intervening said body and springs, means for restraining movement of said springs laterally yet permitting movement longitudinally, and movement vertically against the resistance of said yielding fulcrum support.

4. The combination of a vehicle body, an axle, a spring pivoted to one side of the body and to the end of the axle furthest therefrom, a spring pivoted to the other side of the body and to the opposite end of the axle, means carried by the body adapted to embrace the springs in such a manner as to restrain their movement laterally, but permitting longitudinal movement and vertical movement, a fulcrum support intervening said body and springs adapted to resistingly yield under pressure.

5. The combination of a vehicle body, an axle, a spring pivoted to one side of the body and to the end of the axle farthest from said side, a second spring pivoted to the other side of the body and to the other end of said axle, a resilient load supporting member carried by the body bearing on the springs at their crossing point in such a manner as to form a yielding fulcrum therefor while engaging said springs in such a manner as not to restrain their longitudinal movement relative thereof.

6. The combination of a vehicle body, an axle, a spring pivoted to one side of the body and to the end of the axle farthest from said side, a second spring pivoted to the other side of the body and to the other end of said axle, resilient body supporting means bearing on each of said springs intermediate its ends in such a manner as to permit longitudinal movement of each spring relative said means.

7. The combination of a vehicle body, an axle, a spring pivoted to one side of the body and to the end of the axle farthest from said side, a second spring pivoted to the other side of the body and to the other end of the axle, body supporting means adapted to serve as a yielding fulcrum bearing for each of said springs resting thereon intermediate the ends of the springs and so constructed and arranged as to permit movement of each spring longitudinally relative said means.

8. The combination with a vehicle body, an axle, a spring pivoted to one side of the body and the opposite end of the axle, a spring pivoted to the other side of the body and to the opposite end of the axle, means depending from the body adapted to embrace said springs to limit lateral distortion but permitting vertical and longitudinal movement thereof, a spring-supported fulcrum intervening said body and each of said springs so as to form a yielding support therefor.

9. The combination of a vehicle body, an axle, a spring pivoted to one side of the body and to the end of the axle farthest from said side, a second spring pivoted to the other side of the body and to the other end of the axle, supporting means depending from the body adapted to bear on the upper surface of said springs in such a manner that the body load will be carried thereby, said supporting means so constructed as to serve as a resilient fulcrum for said springs and being so shaped and arranged and bearing on said springs in such a manner as to permit free longitudinal movement of the springs relative thereof.

10. The combination of a vehicle body, a spring pivoted to one side of the body and the end of the axle furthest therefrom, a spring pivoted to the other side of the body and the opposite end of the axle, a forked member depending from the body adapted to embrace such supporting springs in such a manner as to prevent lateral movement thereof while permitting movement longitudinally of the springs and vertical movement within said forked member, a spring pivoted at opposite ends to opposite sides of the body positioned above each of said supporting springs likewise embraced by said forked member and in such a manner as to permit vertical movement therein.

In testimony whereof, I sign this specification.

FRANK V. COOKE.